US006485080B2

(12) United States Patent
Hansen et al.

(10) Patent No.: US 6,485,080 B2
(45) Date of Patent: Nov. 26, 2002

(54) ELECTRIFICATION SYSTEM FOR REMOVABLE VEHICLE SEATS

(75) Inventors: Scott A. Hansen, Holland, MI (US); Nels R. Smith, Holland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/776,214

(22) Filed: Feb. 2, 2001

(65) Prior Publication Data
US 2002/0105203 A1 Aug. 8, 2002

(51) Int. Cl.$^7$ .................................................. B60N 2/04
(52) U.S. Cl. ................................................... 296/65.03
(58) Field of Search ................... 296/65.03; 248/503.1; 439/34

(56) References Cited

U.S. PATENT DOCUMENTS

| | | | | |
|---|---|---|---|---|
| 4,763,360 A | * | 8/1988 | Daniels et al. | 340/310.08 |
| 5,696,409 A | * | 12/1997 | Handman et al. | 307/10.1 |
| 5,752,845 A | * | 5/1998 | Fu | 439/247 |
| 6,050,835 A | * | 4/2000 | Henrion et al. | 296/65.03 |
| 6,199,948 B1 | | 3/2001 | Bush et al. | |
| 6,250,703 B1 | * | 6/2001 | Cisler et al. | 296/65.03 |
| 6,257,641 B1 | * | 7/2001 | Fritz et al. | 296/65.03 |
| 6,279,981 B1 | * | 8/2001 | Mesnage | 296/65.03 |
| 6,343,939 B1 | * | 2/2002 | Inoue | 439/34 X |

FOREIGN PATENT DOCUMENTS

| | | |
|---|---|---|
| DE | 19743313 | 12/1998 |
| DE | 19737268 | 5/1999 |
| EP | 0855308 | 7/1998 |
| FR | 2776591 | 10/1999 |
| WO | WO9956981 | 11/1999 |

OTHER PUBLICATIONS

International Search Report mailed Jun. 13, 2002.

* cited by examiner

Primary Examiner—D. Glenn Dayoan
Assistant Examiner—Jason Morrow
(74) Attorney, Agent, or Firm—Foley & Lardner

(57) ABSTRACT

An electrification system for removable vehicle seats, includes electrical contacts located on the vehicle and electrical contacts located on the removable seat. Coupling members are provided for selectively installing the seat to the vehicle and for removing the seat to provide additional cargo space. In the preferred embodiment, the electrical contacts are arranged so that when the seat is installed, the contacts engage one another to provide power to the rear seat which in turn can be used with a variety of electrical devices, including seat heaters, seat ventilation devices, computers, entertainment or educational systems, illumination devices, and the like. In this embodiment, the electrical contacts on the vehicle are provided in the wells into which the seat coupling components fit and the contacts on the seat are located near the seat coupling members. The seat is hooked over rods within the well and rotated to its installed position. In such position, the seat is powered. There is no need to plug and unplug connectors. Alternately, the electrical contacts can be located remotely from the coupling components, as long as they come into engagement when the seat is in its installed position, or plugs which require coupling by the operator can be used.

32 Claims, 4 Drawing Sheets

ELECTRIFICATION SYSTEM FOR REMOVABLE VEHICLE SEATS

BACKGROUND OF THE INVENTION

1. Field of the Invention

The present invention relates generally to the art of motor vehicle seating and more particularly to seats which are powered for various purposes such as heating, ventilation, lighting and many other applications. Still more particularly, the present invention relates to providing power to removable seats without using plug connectors or other wiring systems which can become damaged if the seat is inadvertently removed without uncoupling them.

2. Description of the Prior Art

It would be desirable to provide power to removable seats for such vehicles as SUVs and vans. One way we believe it can be done is by using electrical connectors which are coupled by the operator for the power to flow to the rear seat. To remove the seat, using any of large variety of known removable seat coupling techniques, it would then be necessary to uncouple the electrical connectors. If the operator forgets to disconnect them, damage would result to the wiring system, and power could not flow to the seat until a repair is conducted.

Power in removable seats can be used for a variety of purposes, including providing power ports on the seats, courtesy or task lighting, seat belt indicators, heating the seats, ventilating the seats, powering seat mounted video or speakers, providing lumbar support or massage capabilities, occupant detection, powering an integrated cooler, powering of adjustment mechanisms (such as those which change seat height, tilt and horizontal positioning), the powering of seat back utility modules, powering seat belt pretentioners, and supplying power to communication systems. It would be most desirable to provide power for such applications using an electrification system which does not require coupling and uncoupling of electrical connectors each time the seat is removed. An electrification system having this capability would represent a significant advance in this art.

FEATURES AND SUMMARY OF THE INVENTION

One feature of the present invention is to provide power to removable vehicle seats.

Another feature of the present invention is to provide an electrification system for a removable vehicle seat which does not require the operator to plug and unplug electrical connectors.

A different feature of the present invention is to provide an electrification system for a removable vehicle seat which is automatically connected when the seat is properly installed to the vehicle.

A different feature of the present invention is to provide an electrification system for a removable vehicle seat wherein electrical connection is made in the vicinity of the coupling members used to join the removable seat to the vehicle.

Yet another feature of the present invention is to provide an electrification system for a removable vehicle seat in which the electrical connection is made during the process of installing the seat to the vehicle.

A further feature of the present invention is to provide an electrification system for a removable vehicle seat in which an indicator is provided to alert the operator if the seat is not properly installed to the vehicle and electrification is not present at the seat.

How the foregoing and other features of the invention are accomplished will be described in the following detailed description of the preferred embodiment, taken generally with the FIGURES. Generally, however, they are provided by an electrification system which includes electrical contacts mounted to the vehicle and electrical contacts located on the vehicle seat. The respective contacts are arranged in such a manner that they come into electrical engagement with one another when the seat is moved from a disconnected to a fully installed position. In one illustrated embodiment, the vehicle electrical contacts are conductive strips located within the floor wells of the seat coupling members, and the electrical contacts for the seat comprise cylindrical conductive rods which are spring loaded so that a wiping action occurs between the rod tip and the strip as the seat is installed. Alternately, the electrical contacts can be located remotely from the seat coupling members but are still arranged so that contact is made at the time the seat is installed. In either embodiment, covers may be provided for the electrical contacts of the vehicle and/or the seat when the seat is being stored, to prevent contamination of the contacts. In a further embodiment of the invention, an indicator, such as an RF transmitter, can be provided to indicate either the presence or the absence of power in the removable seat. The present specification further identifies a number of electrical devices that may be coupled to the electrical contacts of the vehicle seat to provide enhanced functionality at the rear seat. Other ways in which the features of the invention are accomplished will become apparent to those skilled in the art after they have read the detailed description of the invention which follows. Such other ways are deemed to fall within the scope of the invention if they fall within the scope of the claims which follow.

DESCRIPTION OF THE FIGURES

In the FIGURES, like reference numerals are used to denote like components and

DETAILED DESCRIPTION OF THE PREFERRED AND ALTERNATE EMBODIMENTS

Before beginning the detailed description of the preferred and alternate embodiments of the present invention, several general comments can be made about the applicability and the thereof.

First, the devices, mechanisms, or systems which use the electrical power furnished to the removable seat can be selected from a wide variety of known systems. For example, electrical power may be used for seat warming or ventilation. Power ports can be provided for computers or other electronic devices. Power can be used to provide courtesy or task lighting, as well as for use with seat mounted videos, speakers or other entertainment devices. Power lumbar supports or massage units can be included with appropriate electrification, as can occupant sensing, seat belt indicator devices and communication devices which carry sound from the rear seat toward the operator. In addition, various devices can be integrated with the seat, such as coolers or other utility modules, and seat position adjusters, such as those frequently found in the front seat of passenger vehicles, can be powered for adjustment of $2^{nd}$ or $3^{rd}$ row removable seats.

Second, while one particular form of seat coupling is illustrated in FIGS. 1–4, the principles of the present invention may be applied to a wide range of seat coupling systems, so long as the end result is the engagement of electrical contacts on the vehicle and electrical contacts on the seat when the seat is in its installed position. A rotational coupling system is illustrated in the FIGURES, and it provides a wiping and self-cleaning action on the electrical contact areas. However, such rotation is not required for the present invention.

Figure 7:
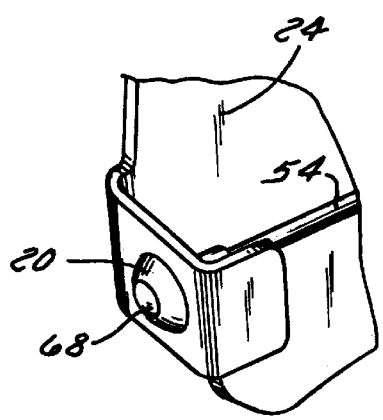
FIG. 7 is a partial view of a mounting bracket and coupling member for mounting the seat electrical.

Third, the present invention illustrates electrification components adjacent to or made part of the coupling components (see the perpendicular flange 80 in FIG. 7) and utilizing contacts within the coupling wells located on the floor of the vehicle. The invention has a broader scope, however, because the electrical contacts could be located remotely from the coupling components, so long as they are brought into engagement when the seat is installed to the vehicle.

Fourth, a variety of different types of electrical contacts may be used. In the illustrations, conductive strips and a conductive rod having an enlarged tip are illustrated, but other types of bars, strips, rods, plugs, and inserts can be used, the primary requisite being electrical contact through engagement occasioned by the process of seat installation, i.e. there should be no separate step required for engaging the electrical contacts. For example, electrical contacts could be arranged on the floor and on the seat be spaced apart until the last lever movement is made by the operator to lock the seat in place. The rotation of the lever can serve to bring the electrical contacts into engagement with one another. In such a system the unlatching of the seat for removal would disconnect the electrical contacts.

Fifth, the particular arrangement of the electrical contacts on the seat and the car can be widely varied, and practical considerations as well as performance considerations may come into play. For example, if the seat has a normal stored position, e.g., if it is designed to be stored in a garage, it is desirable to locate the vehicle contacts at a location other than one which would contact the garage floor. Similarly, it is desirable to place the electrical contacts in the vehicle at locations where they are not readily contaminated when the seat is removed. Covers such as rubberized panels, brush covers and the like can be used to cover the electrical contacts on the vehicle and/or the seat, so long as they do not interfere with engagement at the time the seat is installed and locked.

Figure 6:
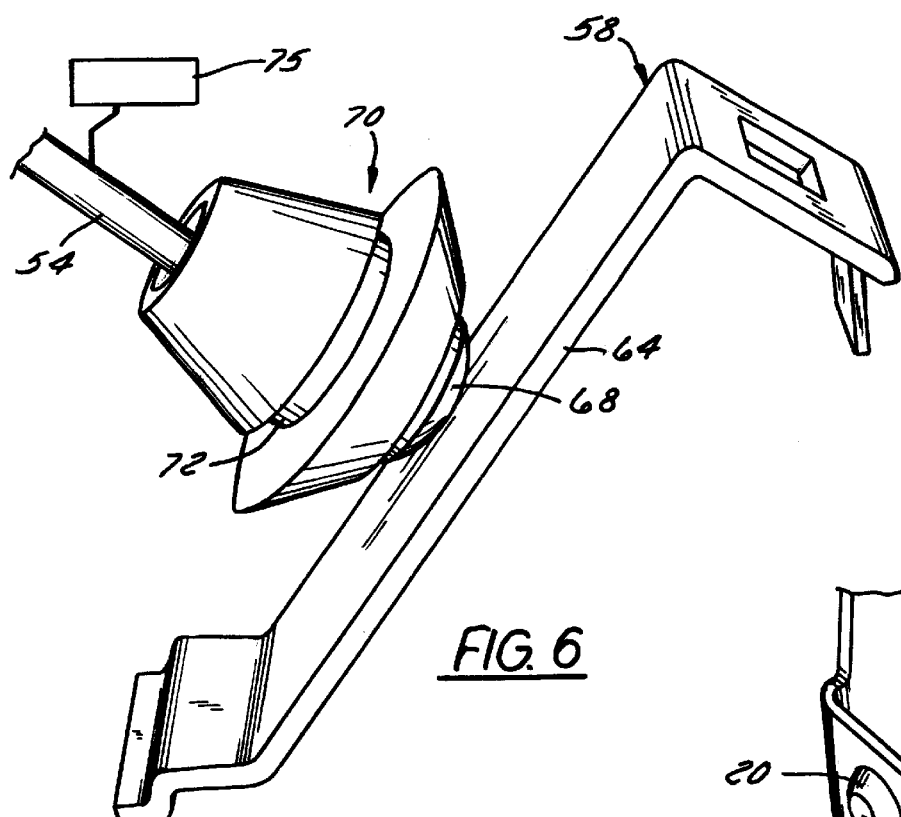
FIG. 6 is a view showing the components of FIG. 5 in electrical contact.

Sixth, suitable indicators can be provided and one is illustrated in FIG. 6. The indicator would provide a visual or audible indication to the operator that the rear seat is installed properly and that the rear seat electrification has occurred. The indicator could be a positive indicator to inform the driver that a successful installation of the seat has taken place, or as a warning indicator when the seat has been installed improperly such that the electrification system components are not functioning.

Seventh, a variety of materials can be used for the electrical contacts and can be selected from any of those currently used in vehicle electrical systems. These can include, for example, conductive metals, conductive metal alloys and conductive plastics.

Eighth, while electrification will typically be 12-volt electrification, inverters can be used to provide AC power for specific applications.

Ninth, power can be provided in a less desirable embodiment by providing one electrical connector on the vehicle and one on the removable seat, with the operator manually connecting the two when the seat is installed. Before removal of the seat, the operator would uncouple the connectors.

Figure 1:
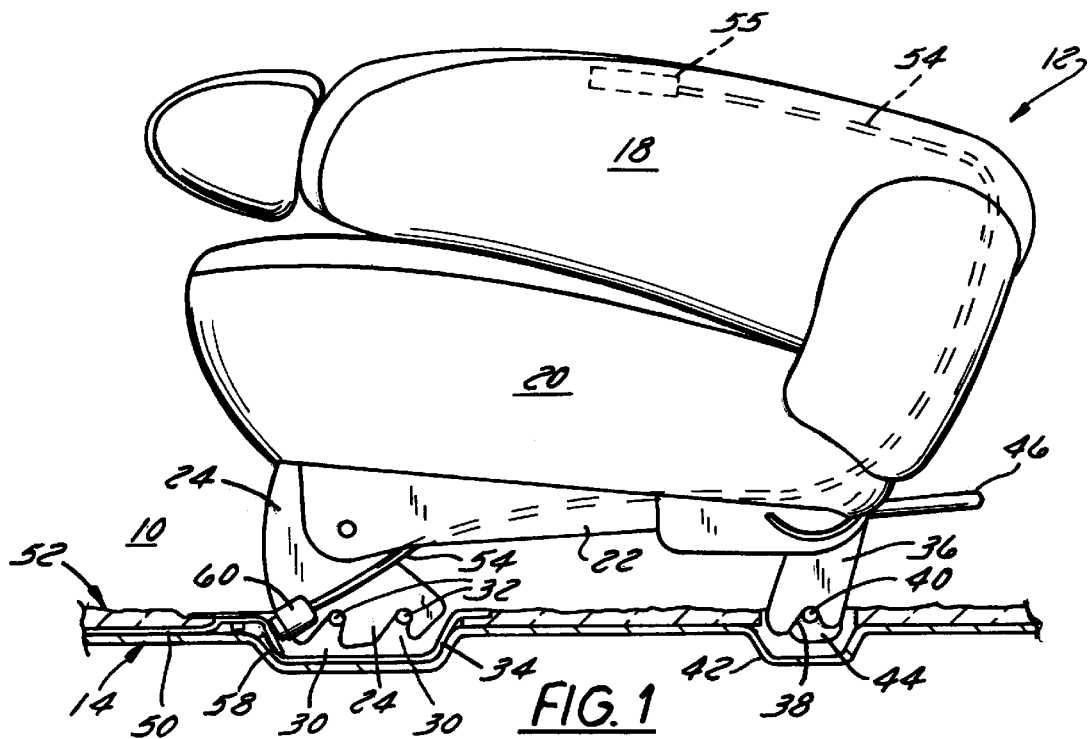
FIG. 1 is a side plan view, with parts broken away, showing the removable seat electrification system of the present invention, with the seat in the installed position.

Proceeding now to a description of the preferred and alternate embodiments, FIG. 1 illustrates a vehicle seat electrification system 10, in which a seat 12 is installed and locked to the floor 14 of a vehicle. Seat 12 includes a back 18, a cushion 20, and a frame 22. The seat 12 is shown in its folded position, and internal mechanisms (not shown) are provided to permit selective folding of back 18 against cushion 20 to permit convenient removal and storage of seat 12.

In the illustrated system 10, the seat 12 includes front coupling members 24 (it being appreciated that at least two of such coupling members will be present). Coupling members 24 include slots 30 for being placed over rods 32 located within wells 34 in the floor 14. Seat 12 also includes rear coupling members 36 which likewise include slots 38 adapted to fit around rods 40 located in rear wells 42. Furthermore, hooks 44 are provided for surrounding rods 40 when a lever 46 is activated by the vehicle operator. In FIG. 1 the lever 46 is in the locked position, and it will be seen that seat 12 is attached and locked to floor 14 since hooks 44 surround rods 40 and prevent movement of seat 12.

As indicated earlier, any of a variety of seat coupling mechanisms may be employed in the electrification system 10 of the present invention and they do not, in and of themselves, form part of the present invention. The electrification components will be described later in this section of the specification, but initially, the seat coupling sequence will be described in connection with FIGS. 1–4. This description is provided to assist the reader in understanding how electrification of a removable seat is accomplished in the present invention, and it is not intended to be an exhaustive description of the coupling processes or components themselves. One skilled in the art will readily be able to adapt the electrification components to any of a variety of removable seating structures and to different types of vehicles (e.g., SUVs and vans).

Figure 2:
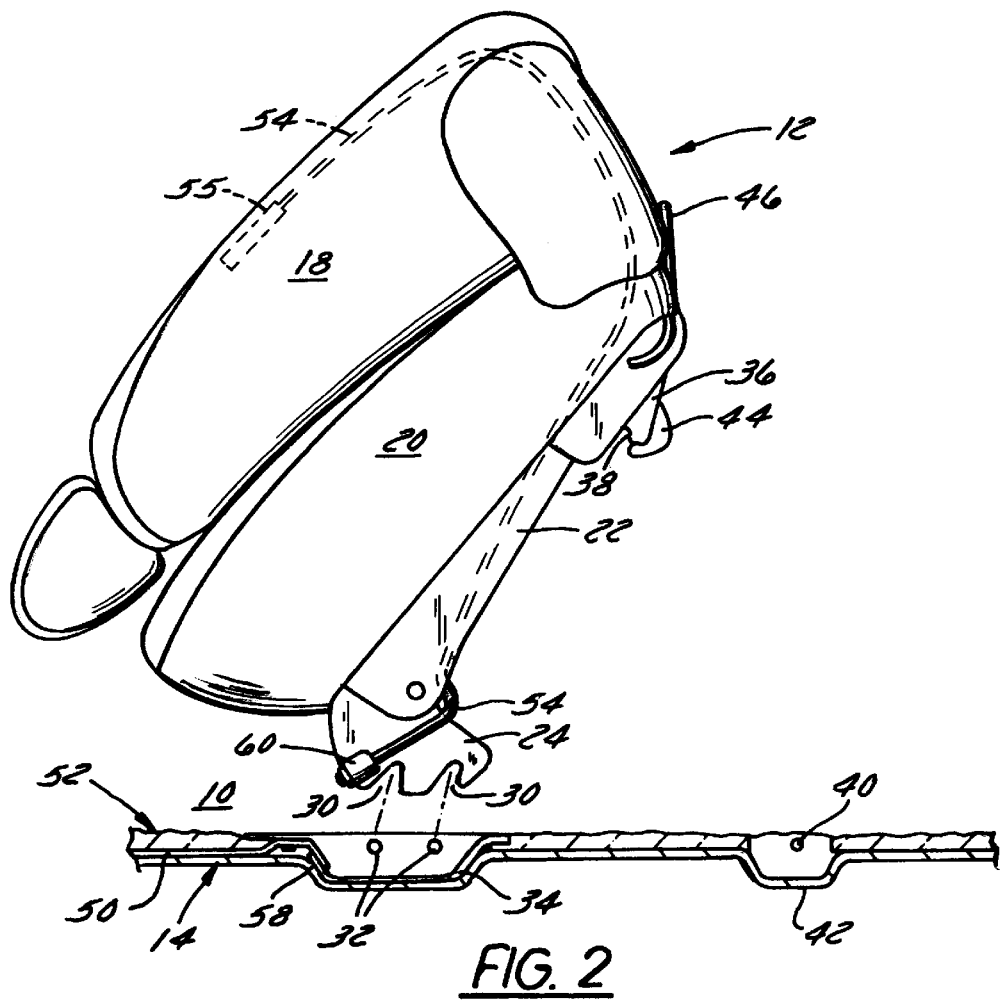
FIG. 2 is a side view, with parts broken away, showing the seat in a position in which it is about to be lowered into contact with the front seat coupling mechanism on the floor of the vehicle.

In FIG. 2, the lever 46 is in the release position and the seat 12 is angled with respect to the position shown in FIG. 1. The slots 30 of front coupling members 24 are positioned above rods 32.

Figure 3:
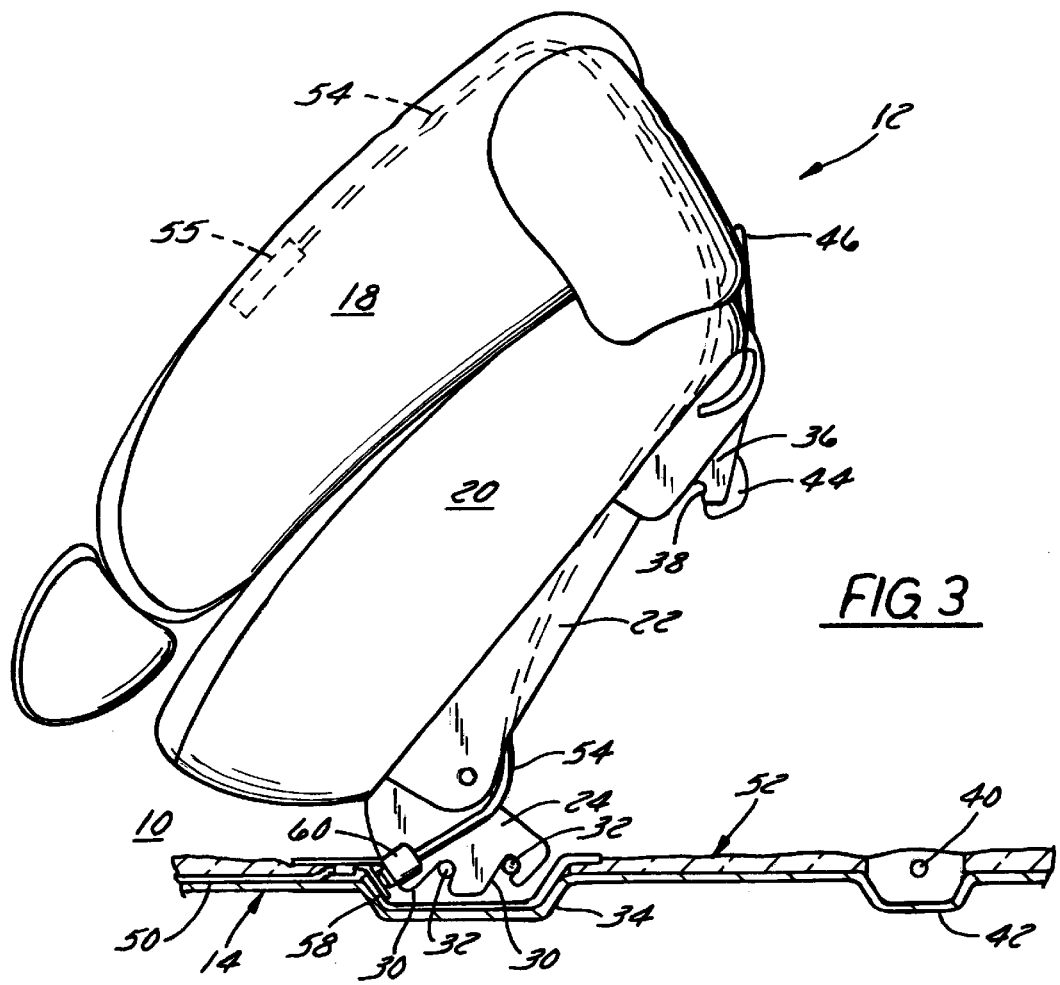
FIG. 3 is a view similar to FIGS. 1 and 2, with the forward part of the seat lowered over coupling rods.
Figure 4:
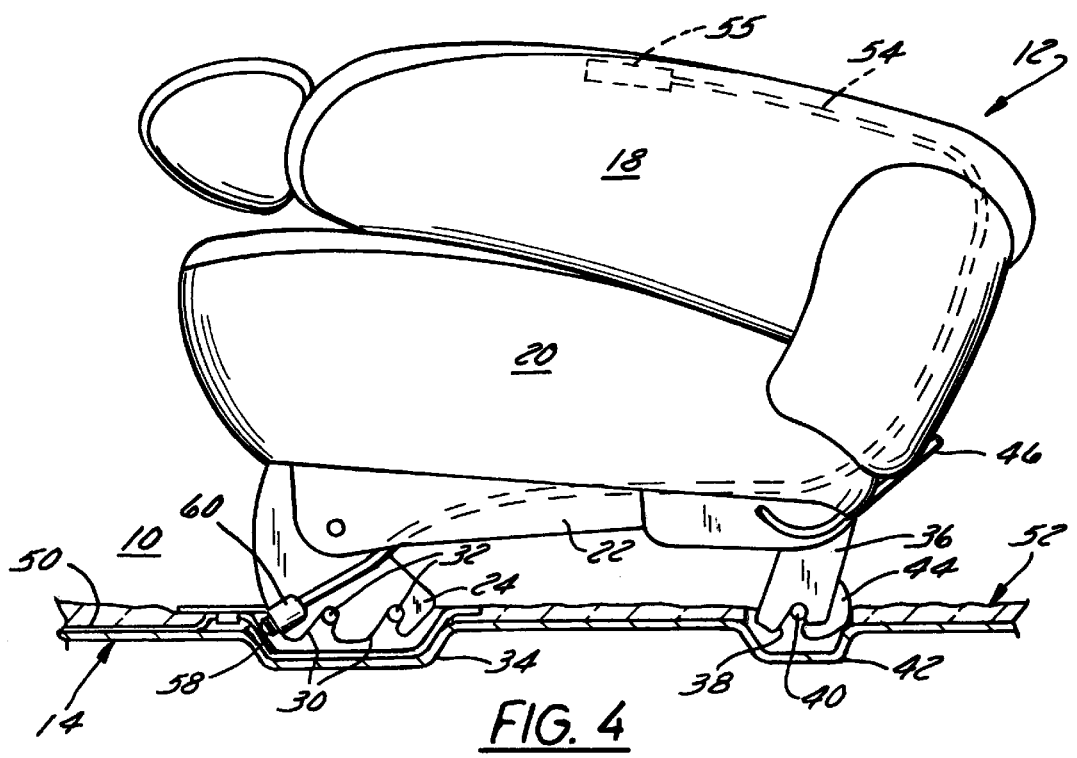
FIG. 4 is a view similar to FIGS. 1–3 and showing the seat in the installed, but unlocked, position.

In FIG. 3, the seat 12 has been lowered so that rods 32 slide within slots 30, and the seat 12 is still disposed in an upright angled position. Rotation of the top of seat 12 brings slots 38 down and over rods 40, the front coupling slots 30 rotating down under rods 32. This position is illustrated in FIG. 4. Installation of the seat 12 is completed by lifting upwardly on lever 46, causing the hooks 44 to slide beneath rods 40. In this position the seat 12 is securely locked in place and will not move until lever 46 is activated once again.

The electrification components can now be described in connection with this particular seat 12. A power cord 50 is shown running beneath the carpeting 52 on floor 14 and is coupled to the vehicle's electrical power source. Similarly, a power cord 54 is shown entering the cushion 20 and is coupled to one or more of the various power mechanisms, devices and systems listed in the beginning portion of this section of the specification (e.g., seat heaters, lighting, position adjusters, occupant detectors, etc.). Those particular mechanisms, devices and systems also will not be described in detail here as they are known for seating which is hard wired or which has power provided through cords and connectors which must be coupled or uncoupled each time the seat is installed or removed, respectively. Such devices are represented in FIGS. 1–4 by the rectangular box labeled as element 55.

Referring again to FIGS. 1–4, it will be noted that vehicle electrical contacts 58 are provided within wells 34, these contacts being electrically coupled to power cord 50. Seating electrical contacts 60 (see FIGS. 5 and 6) are provided at a location on seat 12 that places them in engagement with vehicle contacts 58 when the seat 12 is in its installed and locked position. Contacts 60 are coupled to power cord 54. It should be readily appreciated that pairs of contacts will actually be used, typically one being grounded and the other being powered.

Figure 5:
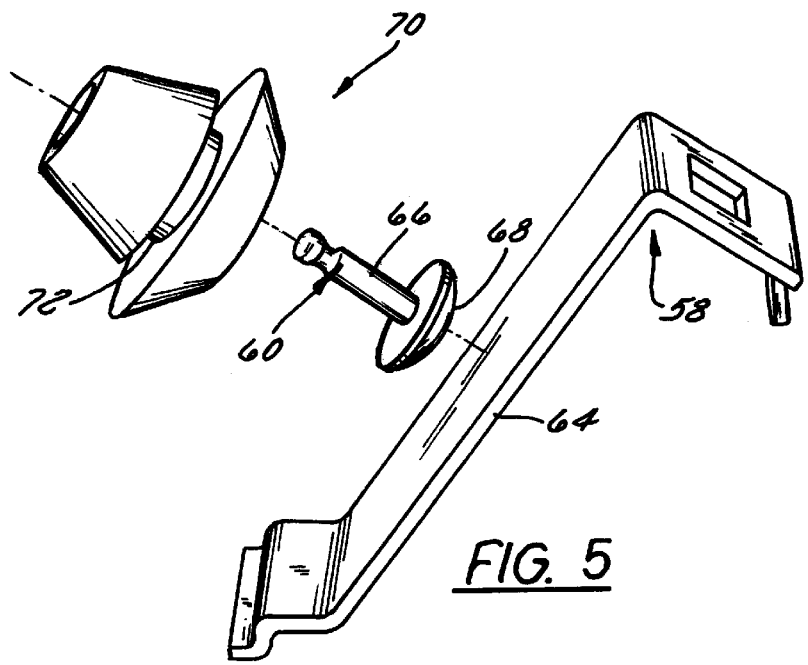
FIG. 5 is an exploded view of preferred electrical contacts to be located on the vehicle and the seat.

Referring now in greater detail to FIGS. 5 and 6, the former shows a preferred shape of the seat electrical contact 60, i.e., a rod 66 having the enlarged and rounded tip 68. In the illustrated system 10, the contacts 58 are conductive strips 64 located against the inner forward wall of wells 34, while the seat electrical controls are rods 66 (described in detail below). The rods 66 each have a rounded and enlarged tip 68 which engages strips 64 and wipes against the strips 64 as the seat is rotated from the position shown in FIG. 3 to the position shown in FIG. 4.

Also shown in these FIGURES is an elastomeric grommet 70 having an axial hole (not shown) for receiving rod 66 and a circumferential groove 72 adapted to snap into a hole in the coupling component 24. FIG. 6 shows the seat electrical contact 60 assembled along with the strip 64 and power cord 54.

From this description it will now be appreciated that the rod 66 and tip 68 are free to move axially when pressure is exerted on tip 68 due to the presence of the elastomeric grommet 70. This freedom of movement prolongs part life and ensures good electrical contact, even after many removals and installations of seat 12. It is also apparent now that these parts have been described and illustrated how a wiping action occurs when the seat 12 is installed, especially during movement of the seat from the position shown in FIG. 3 to the position shown in FIG. 4.

As discussed above, the particular types of electrical contacts employed are not critical to the invention, as long as contact between the seating and the vehicle components is established when the seat is installed. For example, a strip could be placed on the seat and a rod, with or without the grommet could be located in the floor well, or the grommet/rod type of connectors could be used in both locations so that their tips contact each other when the seat is installed.

It was further described above that an appropriate indicator could be employed to inform the operator when electrification of the removable seat has been established. An example is provided in FIG. 6, where an RF transmitter 75 is electrically coupled to the cord 54 to provide a signal when power is flowing to the removable seat. That signal can be used to provide a positive display (e.g., on the instrument panel, mirror or console), or the absence of such a signal can trigger a warning display (at any of the same locations) that the seat was installed improperly or that some other malfunction has occurred.

Figure 8:
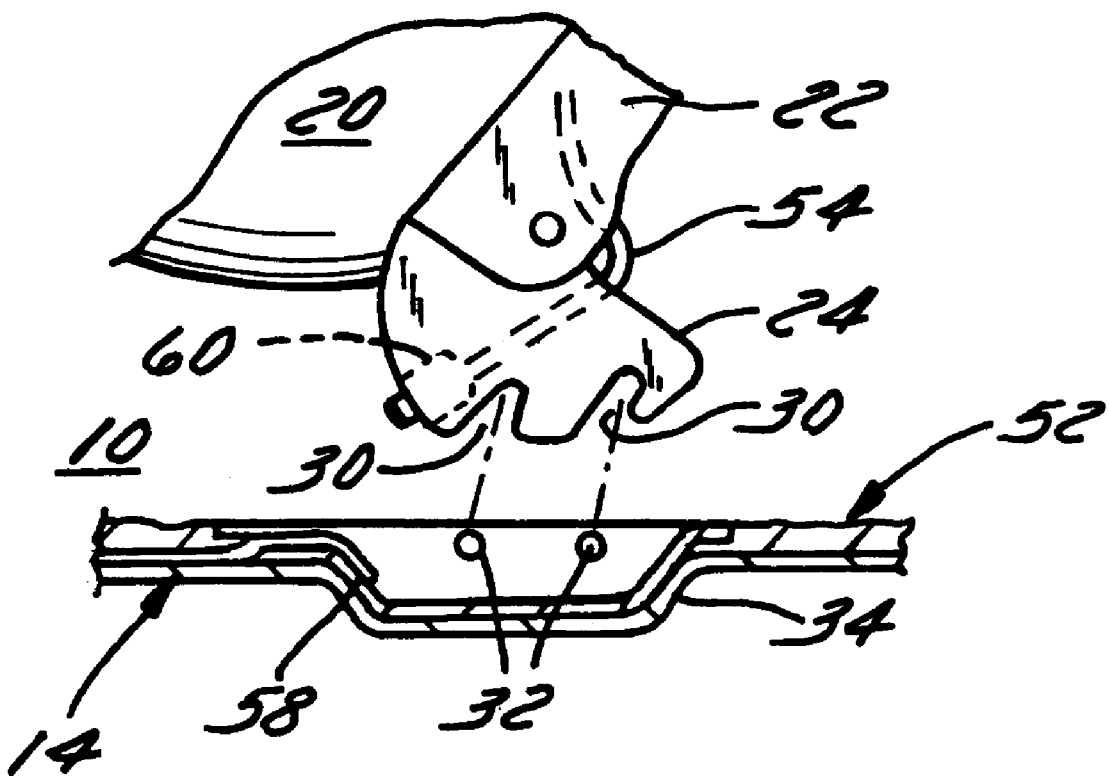
FIG. 8 is a partial side view showing electrical contacts spaced apart from the coupling components.

It was also mentioned above that the electrical contacts do not need to be part of the coupling members. For example, for a removable seat, the coupling components may be located adjacent either side of the seat and the vehicle and seat electrical contacts may be located half way between them. Such an embodiment is represented in FIG. 8. Such contacts must engage one another when the removable seat is installed. Furthermore, covers, especially those that move out of the way during seat installation (e.g., plastic or rubber panels or brush covers) are desirable, especially for the floor well contacts, to reduce of contamination of the contact surfaces.

While the present invention has been described and illustrated in connection with several embodiments and some specific components, it is not to be limited to those descriptions but is to be limited solely by the scope of the claims which follow.

What is claimed is:

1. An electrification system for a removable vehicle seat comprising:

a vehicle having a location for the selective installation and removal of a seat, the location including at least one coupling member to which the seat is installed and from which the seat is removed;

a vehicle seat having at least one coupling member configured to interact with the coupling member on the vehicle to selectively permit installation and removal of the seat;

first electrical contacts on the vehicle;

second electrical contacts on the seat;

the first and second electrical contacts being arranged to engage one another when the seat is installed to the vehicle to provide electrical power to the seat, and to disengage from one another when the seat is removed, without the need for the vehicle user to perform any operations other than those required for seat installation or removal; and wherein the second electrical contacts are conductive rods, each having an enlarged tip, the area of the rod adjacent the tip being surrounded by an elastomeric, non-conductive material.

2. The electrification system of claim 1 wherein the vehicle includes a plurality of wells in the floor, and a vehicle coupling member is located within at least one of the wells.

3. The electrification system of claim 1, wherein the first electrical contacts are located proximate a well.

4. The electrification system of claim 3 wherein the vehicle seat coupling member is arranged to engage a vehicle coupling member located within a well.

5. The electrification system of claim 4, wherein the second electrical contacts are located proximate the vehicle seat coupling member and are arranged to contact the first electrical contacts as the vehicle seat coupling member and the vehicle coupling member engage one another.

6. The electrification system of claim 1, wherein the first electrical contacts are electrically conductive strips.

7. An electrification system for a removable vehicle seat comprising:
- a vehicle having a location for the selective installation and removal of a seat, the location including at least one coupling member to which the seat is installed and from which the seat is removed;
- a vehicle seat having at least one coupling member configured to interact with the coupling member on the vehicle to selectively permit installation and removal of the seat;
- first electrical contacts on the vehicle located proximate a well;
- second electrical contacts on the seat;
- the first and second electrical contacts being arranged to engage one another when the seat is installed to the vehicle to provide electrical power to the seat, and to disengage from one another when the seat is removed, without the need for the vehicle user to perform any operations other than those required for seat installation or removal;
- wherein the vehicle seat coupling member is arranged to engage a vehicle coupling member located within a well;
- wherein the second electrical contacts are located proximate the vehicle seat coupling member and are arranged to contact the first electrical contacts as the vehicle seat coupling member and the vehicle coupling member engage one another; and
- wherein the first electrical contacts are conductive strips on an interior surface of the well, the second electrical contacts are conductive rods each having a contact tip arranged to contact the strips when the vehicle seat is installed to the vehicle.

8. The electrification system of claim 7, wherein the conductive rods are mounted to the vehicle seat using an elastomeric member adjacent their tips to allow the rods to move longitudinally against elastomeric forces as the seat is being installed or removed from the vehicle, whereby the tip is wiped against the strip during attachment or removal of the seat to assist in cleaning the tip.

9. The electrification system of claim 1, wherein the first and second electrical contacts are made from a conductive material selected from the groups consisting of conductive metals, conductive metal alloys, and conductive plastics.

10. The electrification system of claim 1, wherein the first and second electrical contacts are located proximate to the vehicle coupling member and vehicle seat coupling member, respectively.

11. The electrification system of claim 1, wherein the first and second electrical contacts are located at positions which are spaced apart from the vehicle coupling member and vehicle seat coupling member, respectively.

12. The electrification system of claim 1, wherein the coupling members are arranged so that a vehicle seat coupling member engages a first vehicle coupling member and the seat is then rotated to install the seat to the vehicle and to engage the first electrical contacts with the second electrical contacts.

13. The electrification system of claim 1, wherein the vehicle seat is a second or third row seat in a passenger vehicle.

14. The electrification system of claim 1, further including an electrically powered device as part of the seat, the device being electrically coupled to the second electrical contacts.

15. The electrification system of claim 14, wherein the device is selected from the group consisting of a seat heater, a seat portion adjustment mechanism, a seat ventilation system, an entertainment system, an educational system, a communications system, a seat belt system, a computer system, a warning system and an illumination system.

16. The electrification system of claim 1, wherein the first electrical contacts are at least partially protected from contamination when the vehicle seat is removed from the vehicle.

17. The electrification system of claim 16, wherein the first electrical contacts are at least partially covered when the vehicle seat is removed from the vehicle.

18. An electrification system for second and/or third row removable seats for passenger vehicles which does not require the operator to plug or unplug electrical connectors which could be damaged if left connected during the process of seat removal, the system comprising:
- electrical contacts on the vehicle and electrical contacts on each seat to which it is desired to supply electricity, the vehicle electrical contacts engaging the seat electrical contacts when the seat is installed in the vehicle, wherein the electrical contacts are wiped into engagement with one another during the rotation of the seat with respect to the vehicle and;
- coupling components on the vehicle and on each seat to which it is desired to supply electrical energy, the components permitting selective installation and removal of the seats from the vehicle.

19. The electrification system of claim 18, wherein the coupling components are arranged to attach the seat when the seat is hooked over a coupling rod of the vehicle and rotated.

20. The electrification system of claim 18, further including an electrically powered device as part of the seat, the device being electrically coupled to the seat electrical contacts.

21. The electrification system of claim 20, wherein the device is selected from the group consisting of a seat heater, a seat portion adjustment mechanism, a seat ventilation system, an entertainment system, an educational system, a communications system, a seat belt system, a computer system, a warning system and an illumination system.

22. A method for supplying power to a removable seat of a passenger vehicle without the need to connect electrical connectors comprising the steps of:
- providing electrical contacts on the vehicle coupled to a vehicle power source;
- providing electrical contacts on the removable seat which are arranged to engage the vehicle electrical contacts when the seat is installed to the vehicle, wherein the electrical contacts are wiped into engagement with one another during the rotation of the seat with respect to the vehicle; and
- installing the seat to the vehicle.

23. The method of claim 22, wherein the step of installing the seat includes the steps of coupling a part of the seat to a vehicle part and thereafter rotating the seat.

24. The method of claim 23, wherein the vehicle and seat electrical contacts are each located proximate the coupled parts.

25. The method of claim 23, wherein the vehicle and seat electrical contacts are located at positions spaced apart from the coupled parts.

26. The method of claim 22, wherein the first providing step comprises placing conductive strips on the vehicle coupled to a power source and the second providing step comprises placing a conductive rod in the seat, the rod having a tip arranged to engage the strip when the seat is installed.

27. The electrification process of claim 22, comprising the further step of coupling the vehicle seat electrical contacts to an electrically powered device on the seat.

28. The process of claim 27, wherein the device is selected from the group consisting of a seat heater, a seat portion adjustment mechanism, a seat ventilation system, an entertainment system, an educational system, a communications system, a seat belt system, a computer system, a warning system, and an illumination system.

29. An electrification system for second and/or third row removable seats for vehicles comprising:

coupling components on the vehicle, and on each seat to be powered which permit selective installation and removal of the seats;

an electrical connector on the seat, wherein the electrical connector on the seat is a conductive rod having an enlarged tip, the area of the rod adjacent the tip being surrounded by an elastomeric, non-conductive material; and an electrical connector on the vehicle which may be coupled to the seat connector to supply power thereto;

wherein the electrical connectors are wiped into engagement with one another during the rotation of the seat with respect to the vehicle.

30. A method of supplying power to a removable seat of a vehicle comprising the steps of providing an electrical connector coupled to the vehicle power source, providing an electrical connector on the seat wherein the electrical connector on the seat is a conductive rod having an enlarged tip, the area of the rod adjacent the tip being surrounded by an elastomeric, non-conductive material and connecting the two connectors by wiping the electrical connectors into engagement with one another during the rotation of the seat with respect to the vehicle.

31. The electrification system of claim 7, wherein the second electrical contacts are electrically conductive rods having a contact tip.

32. The electrification system of claim 7, wherein the second electrical contacts are conductive rods, each having an enlarged tip, the area of the rod adjacent the tip being surrounded by an elastomeric, non-conductive material.

* * * * *